(12) United States Patent
Montceau et al.

(10) Patent No.: US 7,387,145 B1
(45) Date of Patent: Jun. 17, 2008

(54) MOTORCYCLE RADIAL TYRE WITH BANDAGE PLY AND EDGE REINFORCING STRIPS

(75) Inventors: Jean-Paul Montceau, Montlucon (FR); Jean-Luc Faure, Villebret (FR)

(73) Assignee: The Goodyear Tire & Rubber Company, Akron, OH (US)

( * ) Notice: Subject to any disclaimer, the term of this patent is extended or adjusted under 35 U.S.C. 154(b) by 1432 days.

(21) Appl. No.: 10/129,514

(22) PCT Filed: Nov. 2, 2000

(86) PCT No.: PCT/EP00/10800

§ 371 (c)(1),
(2), (4) Date: Sep. 3, 2002

(87) PCT Pub. No.: WO01/32447

PCT Pub. Date: May 10, 2001

(30) Foreign Application Priority Data

Nov. 3, 1999 (FR) .................................. 99 13727

(51) Int. Cl.
*B60C 9/22* (2006.01)
*B60C 9/18* (2006.01)
(52) U.S. Cl. ..................... 152/531; 152/526; 152/533; 152/534
(58) Field of Classification Search ................. 152/531, 152/533, 526, 534
See application file for complete search history.

(56) References Cited

U.S. PATENT DOCUMENTS 5,829,503 A * 11/1998 Watkins et al.

FOREIGN PATENT DOCUMENTS

| EP | 0 219 311 A2 | 4/1987 |
|---|---|---|
| EP | 0 628 435 A1 | 12/1994 |
| JP | 10053007 A * | 2/1998 |

* cited by examiner

*Primary Examiner*—Adrienne C Johnstone
(74) *Attorney, Agent, or Firm*—Richard B. O'Planick; David L. King

(57) ABSTRACT

A motorcycle tire comprises a radial carcass ply (1), the carcass in each bead region being turned axially outward around a bead hoop (7) to form a turnup ply portion (8), the tire having a camber value C/L in the range 0.5 to 0.7 characterized in that the tread (6) is provided with a bandage ply (2) disposed radially outward of the carcass ply (1) and comprising cords disposed parallel to the circumferential direction and in the tread central portion the bandage ply (2) is adjacent to the carcass ply (1) and in the axial edge portions of the tread the bandage ply (2) is spaced apart from the carcass ply (1) by a reinforcing strip (3) comprising at least one reinforcing ply comprising textile reinforcing elements disposed at an angle to the tire circumferential direction, the radially outer edge (10) of each turnup portion is separated from the adjacent edge of the reinforcing strip (3) by a distance of at least 5 mm.

9 Claims, 3 Drawing Sheets

MOTORCYCLE RADIAL TYRE WITH BANDAGE PLY AND EDGE REINFORCING STRIPS

TECHNICAL FIELD

This invention relates to radial motorcycle tyres.

Such tyres utilise very wide treads which in transverse cross-section are sharply curved to provide good contact with the road surface when the motorcycle is steeply banked in cornering. Maintenance of a consistent ground contact area or 'tyre footprint' under all conditions is a major problem in determining general vehicle handling.

BACKGROUND ART

Present radial motorcycle tyres have short sidewalls which extend to the tread edges radially and axially outwardly from the tyre beads. The beads provide engagement to the wheel-rim on tapered bead seats. The sidewalls are reinforced by radial carcass plies which when tensioned by the inflation pressure act together with sidewall geometry to provide location of the curved tread regions to withstand cornering forces.

The sharply curved tread region of the conventional motorcycle tyre is specially reinforced by a reinforcing belt or breaker to give the required structural rigidity to allow for banking over of the motorcycle when cornering whilst giving sufficient flexibility to allow localized tread flattening in the ground contact patch for good road grip. Conventionally such a belt comprises two plies of tyre fabric each being reinforced by parallel cords disposed at an angle to the tyre circumferential direction with the cords crossed with respect to the adjacent ply.

Such tyres however, due to their uniform breaker structures, do not provide fully optimum stability and lateral grip.

A motorcycle tyre having in the tread region a bandage ply and in each tread edge region an additional reinforcing ply is known from EP-B-0 628 435. However in this known tyre the ply turnup edge extends fully radially outward to overlap the additional ply. However in such a structure the sidewall stiffness is increased which decreases riding comfort.

Therefore an object of the present invention is to improve the properties of such tyres.

DISCLOSURE OF THE INVENTION

According to one aspect of the present invention a pneumatic motorcycle tyre is provided which comprises a reinforcing carcass ply of radially disposed cords extending in a main ply portion between two bead regions through sidewall regions and a ground contacting tread region, the carcass in each bead region being turned axially outward around an inextensible bead hoop and thereafter extended radially outward to form a turnup ply portion having a radially outer end, the tyre having a camber value C/L in the range 0.5 to 0.7, wherein the tread region is provided with a bandage ply disposed radially outward of the carcass ply extending substantially between the axial edges of the tread and comprising reinforcing cords disposed substantially parallel to the tyre circumferential direction and in the tread central portion the bandage ply is immediately adjacent to the carcass ply and in each of the axial edge portions of the tread the bandage ply is spaced apart from the carcass ply by a reinforcing strip comprising at least one reinforcing ply comprising textile reinforcing elements disposed at an angle to the tyre circumferential direction wherein the radially outer edge of each turnup portion is separated from the adjacent edge of the reinforcing strip by a distance of at least 5 mm. The axially outer edge of each of the strips is disposed radially outward of the radially outer edge of the ply turnup portion and is disposed axially inward of the adjacent edge of the bandage ply by not more than 25% of the reinforcing strip width measured along the carcass ply. The reinforcing elements of the at least one ply may be disposed at an angle in the range of 20° to 70° to the tyre circumferential direction for example in the range of greater than 35° to 70° to the tyre circumferential direction.

By camber value is meant the ratio C/L between the radial distance C from the centre to the edge of the tyre tread and the axial distance L between the centre and edge of the tread.

Preferably the reinforcing elements of the two reinforcing strips are cords disposed at an angle of between 20° to 70° to the tyre circumferential direction.

The reinforcing elements of the reinforcing strip may comprise polyamide, rayon, polyester or aramid cord, polyethylene naphthalate (PEN) or steel.

BRIEF DESCRIPTION OF THE DRAWINGS

Further aspects of the present invention will become apparent from the description of the following embodiments in conjunction with the attached diagrammatic drawing in which:—

MODE FOR CARRYING OUT THE INVENTION

Figure 1:
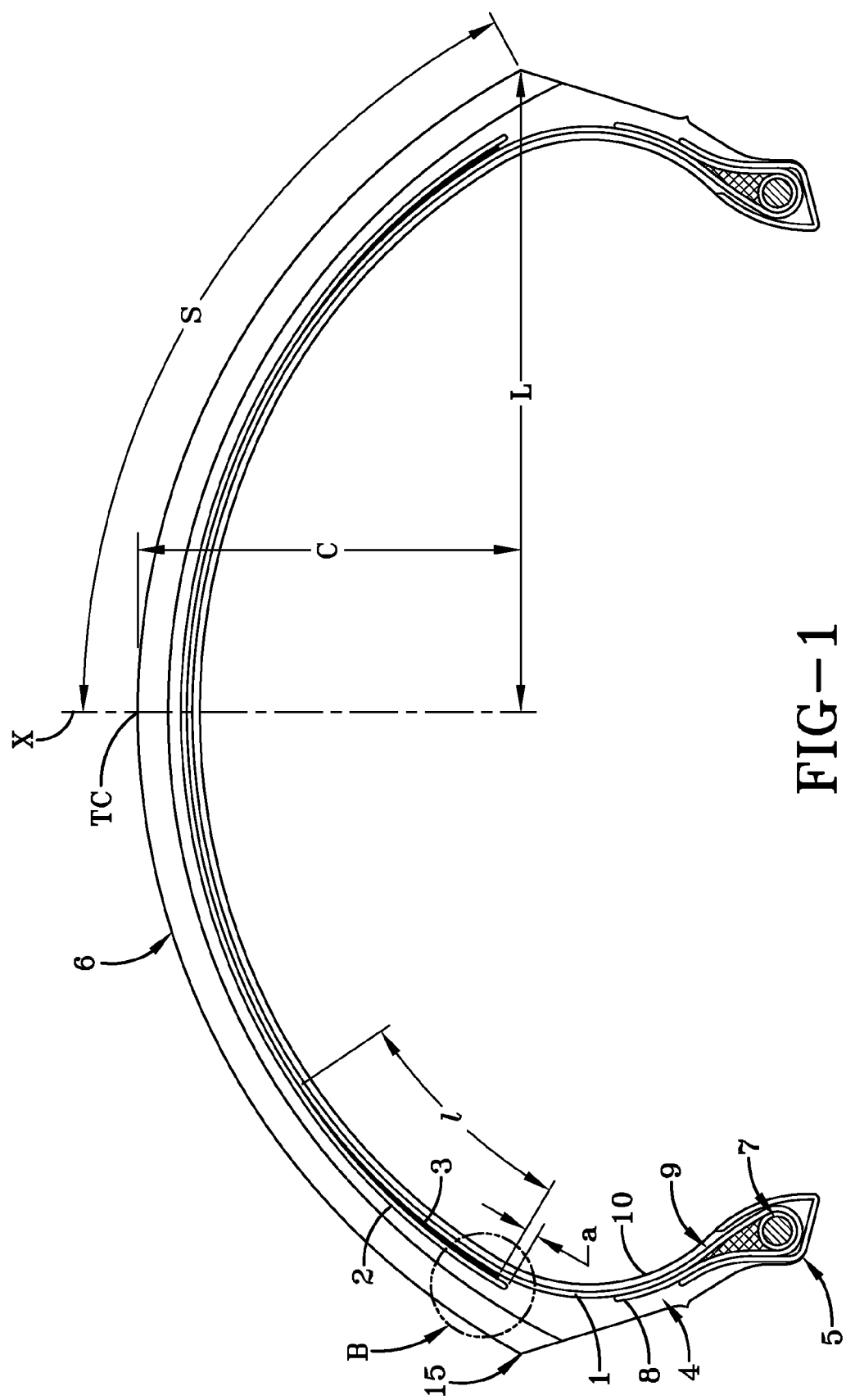
FIG. 1 shows in cross-section a 170/60 R17 radial motorcycle tyre according to a first embodiment of the invention.

The tyre of FIG. 1 comprises a ground contacting tread region 6 a pair of sidewalls 4 terminating in bead regions 5. Each bead region is reinforced by an inextensible annular bead core 7. Extending between each bead region is a tyre carcass reinforcement ply 1 which is anchored in each bead region by being turned around the respective bead core 7 laterally from the inside to the outside to form a ply turnup portion 8 having a radially outer edge 10. The carcass reinforcement ply 1 comprises a single ply tyre fabric laid with the cords substantially radially. Each bead region further comprises a hard rubber apex member 9 which is anchored to each respective bead core and extends taperingly radially outwardly.

The tyre has a camber value of 0.6 and comprises a convex tread region 6, having tread shoulder edges TX. The width of the tread is 220 mm measured along the arc of outer surface, i.e. the arc length of half tread width S between the tread centre TC on the tyre circumferential central axis X and the tread shoulder edge TX is 110 mm.

By camber value is meant the ratio C/L of respectively the radial distance C and the axial distance L between the point of maximum tyre diameter at the tread centre TC and the tread shoulder edge TS.

Disposed in the tread region 6 and radially outward of the ply 1 is a bandage ply 2. The width of the bandage ply taken along the arc of the tread is 100 mm such that the bandage ply 2 extends substantially under the entire ground contacting surface of the tread.

The bandage ply 2 is formed as a 'jointless bandage' and comprises a narrow tape having a plurality of reinforcing elements running longitudinally embedded in rubber, the tape being spirally wound around the circumference of the tyre such that the reinforcing elements lie substantially at 0° or at least a very small angle of less than 5° to the tyre circumferential direction. The reinforcing elements of the narrow tape comprise aramid cords but may also comprise cords or filaments of other textile materials such as nylon, polyester, rayon or glass.

As shown in FIG. 1, in the central region of the tread the bandage 2 is disposed immediately adjacent to, i.e. contacting, the ply 1. However in each of the two axial parts of the tread the bandage 2 is spaced radially apart from the ply by a circumferentially extending reinforcing strip 3 which is interposed between them. Each reinforcing strip comprises a single reinforcing ply comprising plural reinforcing elements embedded in rubber and disposed in parallel configuration and inclined at an angle of 45° to the tread circumferential direction.

In accordance with the invention the axially outer edge 3e of each of the reinforcing strips is spaced apart from the radially outer edge 10 of the adjacent ply turnup by a distance S which is not less than 5 mm. By this the laterally outer portions of the tread are reinforced whilst the radially outer portion of the sidewall has sufficient flexibility to give good ride comfort.

Whilst the above embodiment has a single ply the carcass ply may comprise a plurality of plies.

In this embodiment the reinforcing elements of the reinforcing ply are nylon (polyamide) cord of 940 dtex. Other reinforcing elements which have proved effective in the invention include polyamide of 2100 dtex, rayon of 1840 dtex and aramid.

Figure 3:
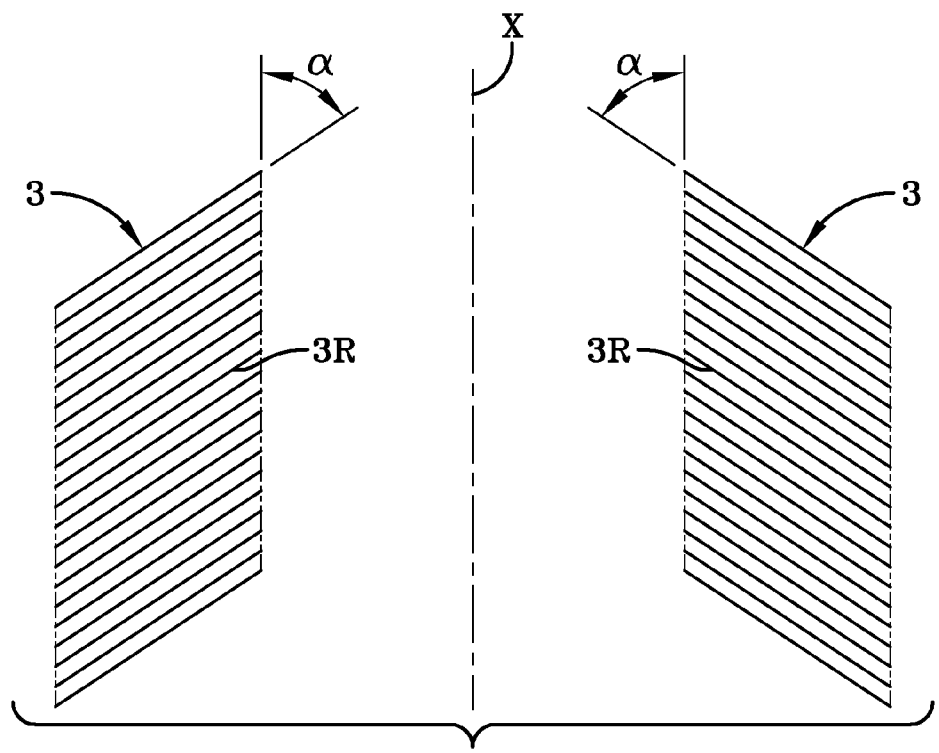
FIG. 3 shows a schematic plan diagram of the symmetrical arrangement of the reinforcing elements about the central equatorial axis of the tyre of FIG. 1.

The reinforcing strips are preferably arranged symmetrically about the central circumferential axis X so that the reinforcing elements 3R of one strip 3 are inclined in the opposite direction to those of the other strip as shown in the schematic diagram of FIG. 3.

In accordance with the invention the reinforcing elements of the reinforcing strip may comprise cords or filaments of tyre materials such as textile materials such as polyamide, polyester, rayon or aramid or polyethylene naphthalate or they may comprise steel cords. Further the reinforcing elements may be inclined at an angle of between 20° and 70° or preferably 45° to 60° to the tyre circumferential direction.

Each of the reinforcing plies of the reinforcing strips 3 has a thickness in the radial direction of 0.7 mm and a width l in the axial direction measured parallel to the arc of the tread of 40 mm which is 36% of the length of the tread arc S which is one half of the tread width. In accordance with the invention the width l of each reinforcing strip may be between 25% and 50% of the arc length S and its thickness in the radial direction may be in the range of 0.5 mm to 3.0 mm.

Figure 2:
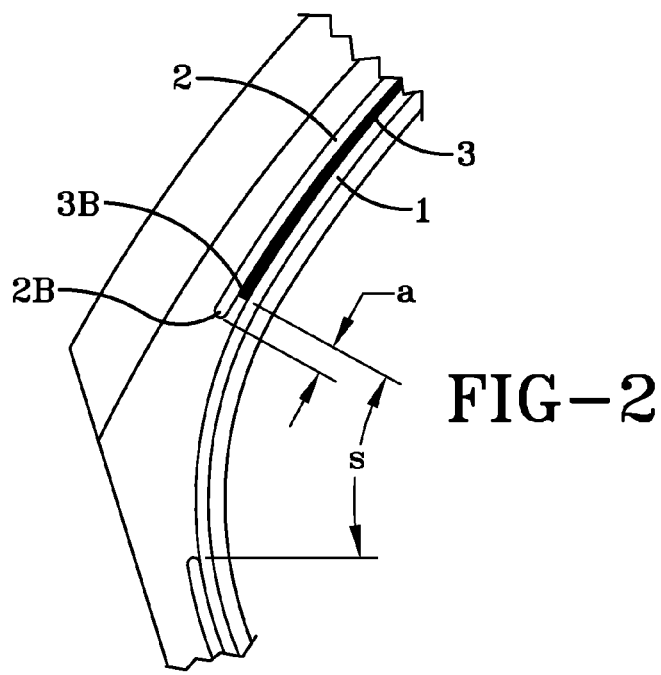
FIG. 2 shows an enlarged detail view of the shoulder region of the tyre of FIG. 1.

In this embodiment, as evident from FIG. 2 which shows an enlarged detail of the shoulder part circled as B in FIG. 1, the axially outer edge 3E of the reinforcing strip 3 is positioned axially inward of the outer edge 2E of the bandage ply 2 and is remote from it by a distance a which in this embodiment is 5% of the width l of the reinforcing strip 3.

In accordance with the present invention, the separation a between the outer edges of the reinforcing strip 3 and the bandage 2 may be up to 25% of the width l of the reinforcing strip.

In no event does the strip extend to lie between the ply turnup 8 and the ply main portion 1.

In other embodiments of the invention each of the reinforcing strips 3 may comprise two reinforcing plies, each comprising parallel reinforcing elements inclined at an angle of between 20°-70° to the tyre circumferential or equatorial direction X.

The two reinforcing plies of the reinforcing strip may be disposed side-by-side or preferably overlap at least partially. In a preferred arrangement one of the plies completely underlies or overlies the other ply.

Figure 4A:
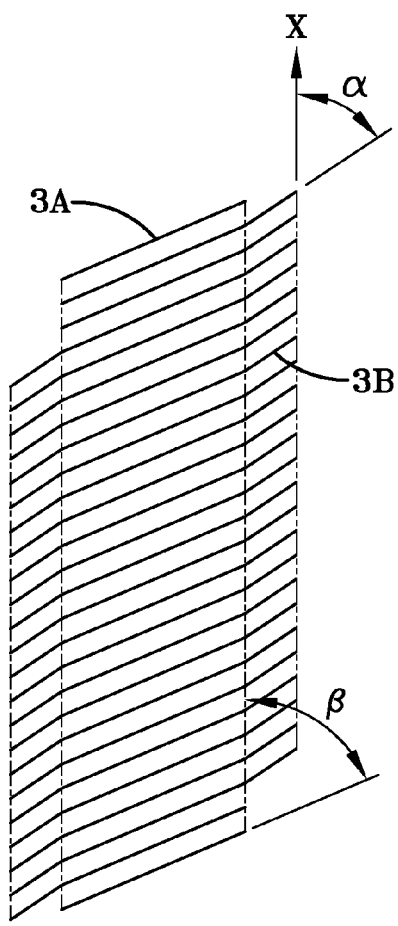
FIGS. 4A-4C show schematic diagrams of other reinforcing strip configurations according to the invention.
Figure 4B:
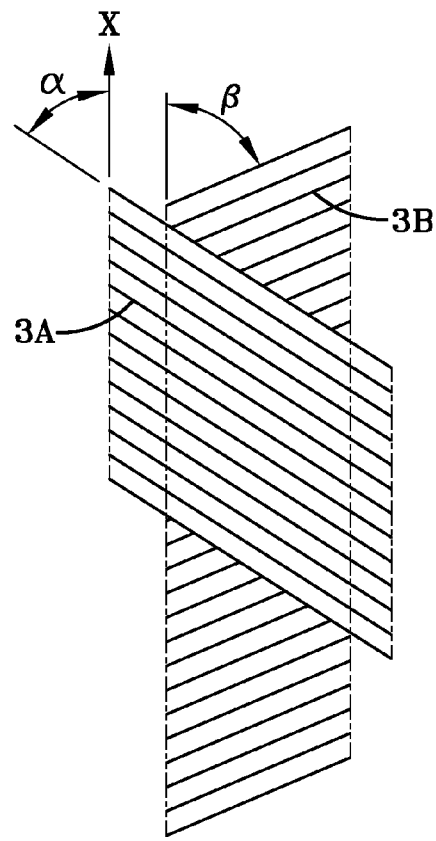
Figure 4C:
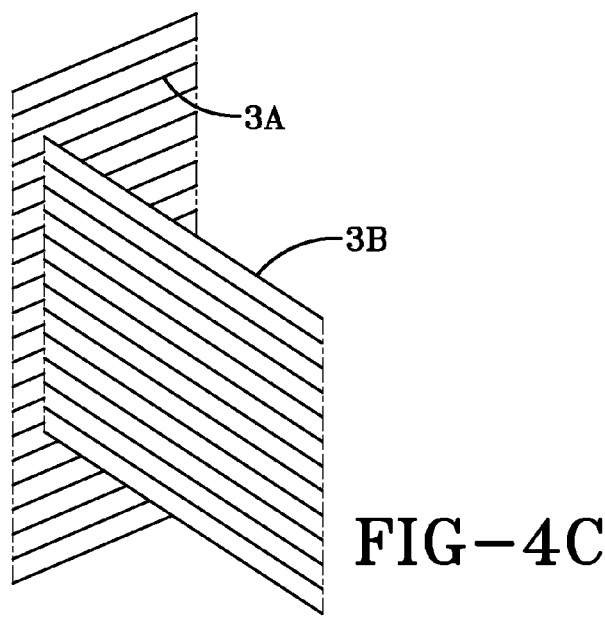

The two reinforcing plies of the reinforcing strip may be of the same axial width or they may be different widths with the wider of the two plies being either the radially inner ply as shown in FIG. 4A or the radially outer ply as shown in FIG. 4B. The reinforcing plies may underlie or overlie each other completely as shown in FIG. 4A and FIG. 4B or partially as shown in FIG. 4C.

Further the reinforcing elements of each reinforcing ply may be inclined in the same direction as shown in FIG. 4A or in opposite directions as shown in FIG. 4B. Furthermore the reinforcing elements of each reinforcing ply may be inclined at the same angle or at different angles $\alpha I$, $\theta$ and $\alpha o$, $\beta$ as shown in FIGS. 4A and 4B.

Tyres prepared in accordance with the invention have demonstrated improved handling characteristics. In particular the tyres have demonstrated improved stiffness and grip at maximum lean angle giving improved stability in cornering together with good straight line stability.

The invention claimed is:

1. A pneumatic motorcycle tyre comprising a reinforcing carcass ply of radially disposed cords extending in a main ply portion between two bead regions through sidewall regions and a ground contacting tread region, the carcass in each bead region being turned axially outward around an inextensible bead hoop and thereafter extended radially outward to form a turnup ply portion having a radially outer end, the tyre having—a camber value C/L in the range 0.5 to 0.7 wherein the tread region is provided with a bandage ply disposed radially outward of the carcass ply extending substantially between the axial edges (TS) of the tread and comprising reinforcing cords disposed substantially parallel to the tyre circumferential direction and in the tread central portion the bandage ply is immediately adjacent to the carcass ply and in each of the axial edge portions of the tread the bandage ply is spaced apart from the carcass ply by a reinforcing strip comprising at least one reinforcing ply comprising textile reinforcing elements disposed at an angle to the tyre circumferential direction, characterized in that the radially outer edge of each turnup portion is separated from the adjacent edge of the reinforcing strip by a distance (S) of at least 5 mm, the axially outer edge of each of the strips is disposed radially outward of the radially outer edge of the ply turnup portion and is disposed axially inward of the adjacent edge of the bandage ply, spaced therefrom by not more than 25% of the reinforcing strip width measured along the carcass ply; wherein the reinforcing elements of the at least one ply are disposed at an angle in the range of greater than 35° to 70°.

2. A tyre according to claim 1, characterised in that the reinforcing elements are cords.

3. A tyre according to claim 1, characterised in that the reinforcing elements of the strip comprise one or more materials selected from the group consisting of polyamide, polyethylene naphthalate (PEN), rayon, polyester, aramid or steel.

4. A tyre according to, claim 1, characterized in that each reinforcing strip has a width (l) measured along the arc of the tread between 25% and 50% of the arc length (S) of the tread between the tread centre (TC) and the tread shoulder (TS).

5. A tyre according to, claim 1, characterised in that the reinforcing strip comprises two reinforcing plies.

6. A tyre according to claim 5, characterised in that the two reinforcing plies of the reinforcing strip overlie each other at least in part.

7. A tyre according to claim 6, characterised in that one of the two reinforcing plies is disposed completely within the edges of the other reinforcing ply.

8. A tyre according to, claim 1, characterised in that each reinforcing strip has a thickness in the radial direction of 0.5 mm to 3.0 mm.

9. A tyre according to, claim 1, characterised in that each reinforcing strip has a thickness in the radial direction of 0.7 mm.

* * * * *